United States Patent
Shah

(10) Patent No.: US 7,707,038 B2
(45) Date of Patent: Apr. 27, 2010

(54) METHOD AND SYSTEM FOR DISTRIBUTING AND TRANSPORTING LARGE NUMBERS OF ITEMS

(75) Inventor: Pranab M. Shah, Glen Burnie, MD (US)

(73) Assignee: United States Postal Service, Washington, DC (US)

( * ) Notice: Subject to any disclaimer, the term of this patent is extended or adjusted under 35 U.S.C. 154(b) by 0 days.

(21) Appl. No.: 10/778,999

(22) Filed: Feb. 13, 2004

(65) Prior Publication Data

US 2004/0178126 A1    Sep. 16, 2004

Related U.S. Application Data

(60) Provisional application No. 60/453,748, filed on Mar. 10, 2003.

(51) Int. Cl.
*G06Q 10/00* (2006.01)
*B07C 5/12* (2006.01)

(52) U.S. Cl. .......................... 705/1; 209/659

(58) Field of Classification Search .............. 705/1, 705/401, 406; 209/584, 592, 576, 44.1, 3, 209/3.1, 3.3, 659
See application file for complete search history.

(56) References Cited

U.S. PATENT DOCUMENTS

| | | | | |
|---|---|---|---|---|
| 4,923,022 A | * | 5/1990 | Hsieh | 177/4 |
| 5,480,032 A | * | 1/1996 | Pippin et al. | 209/583 |
| 6,239,397 B1 | * | 5/2001 | Rosenbaum et al. | 209/584 |
| 6,437,272 B2 | * | 8/2002 | Tamamoto et al. | 209/584 |
| 2002/0070149 A1 | * | 6/2002 | Schererz et al. | 209/540 |
| 2003/0200113 A1 | * | 10/2003 | Latta | 705/1 |

FOREIGN PATENT DOCUMENTS

DE    197 05 891    3/1998
EP    0 373 969    6/1990

OTHER PUBLICATIONS

Bujang, Ashia, Postal Delivery Made Easy With New System, Oct. 28, 1998, Business Times (Malaysia), pp. 1-2.*
Notification of Transmittal of the International Search Report and the Written Opinion of the International Searching Authority, or the Declaration, dated Aug. 9, 2006 (7 pages).
Statement from Pranab M. Shah, dated Oct. 2, 2006 (4 pages).
Communication from European Patent Office in connection with corresponding European Patent Application No. EP 0 471 37165.8 enclosing Supplementary Search Report dated Oct. 23, 2009 (6 pages).

* cited by examiner

*Primary Examiner*—Jamisue A Plucinski
(74) *Attorney, Agent, or Firm*—Finnegan, Henderson, Farabow, Garrett & Dunner, LLP

(57) ABSTRACT

Items to be distributed and transported are separated into at least two categories, based on the shape of the items. Distribution and transportation functions are performed within a system comprising a plurality of Origin Facility/Destination Facility and Network Control Points, with each ODF being assigned to a single NCP. Each ODF, in turn, is assigned one or more geographic area. Items arrive at an ODF, are distributed and then transported to the assigned NCP for further distribution, and then transported to a second ODF for final distribution.

9 Claims, 4 Drawing Sheets

METHOD AND SYSTEM FOR DISTRIBUTING AND TRANSPORTING LARGE NUMBERS OF ITEMS

RELATED APPLICATION

This non-provisional application claims priority to provisional application No. 60/453,748, filed Mar. 10, 2003.

FIELD OF THE INVENTION

This invention relates generally to systems and methods for the efficient transportation of objects from an origination point to a destination point including, more particularly, methods and systems for transporting and distributing large numbers of items, including for example mail items, from an origination point to a destination point.

BACKGROUND OF THE INVENTION

In fiscal year 2000, the United States Postal Service delivered approximately 208 billion pieces of mail. The average daily volume of mail delivered during fiscal year 2000 was 500 million pieces.

At present, the process of delivering the mail is a relatively complicated one. That process can be broken down into two components: (a) transportation and (b) distribution. The term "transportation" as used herein is intended to refer to the nodes and routes, which define the flow of mail (or other objects) between plants/processing facilities (or other sorting points). Transportation includes the inter-plant transportation network and the plant to delivery unit networks. (A delivery unit is a post office, station or branch that has mail delivery functions to the point of final delivery for a mail item.) It does not include activity within the plants themselves.

The term "distribution" as used herein refers to the combination of equipment, processes and plants that sort mail (or other objects). Distribution generally takes place between the point at which originating mail is picked up from its point of origin and the point at which it reaches its point of final delivery. The distribution of mail is assisted by the use of five and preferably nine digit ZIP codes, which refer to defined geographic areas.

It must also be noted that mail items come in varying shapes. Examples of current mail shapes include flat-size, letter-size, parcels, and outsides. Currently, plants process more or less all shapes of mail. However, because mail-processing equipment is generally shape-specific; i.e., can only process one shape of mail item, it is inefficient to locate in each plant every type of processing equipment. Nevertheless, currently, transportation of mail is organized according to mail class, rather than according to mail shape.

A need continually exists to improve and further optimize the transportation and distribution process where a large number of objects must be processed, including particularly in one example a large number of mail objects. Such improvement should rely, among other things, on the use of shape-based criteria in organizing the transportation of mail items (or the like) between plants and their distribution within plants.

DETAILED DESCRIPTION OF THE PREFERRED EMBODIMENTS

This invention is concerned with a system and method for the efficient distribution and transportation of objects from an origination point to a destination point. Preferably, the objects pass through at least one intermediate sorting point, and are there sorted so as to aid in the efficient transportation of the objects through the system. In one embodiment, the objects are mail pieces. However, other, non-mail objects, could also be transported from an origination point to a destination point using the system and method of the present invention.

The system and method of the present invention is intended to accommodate the transportation and, in one embodiment, the distribution, of extremely large numbers of objects. In one preferred embodiment, the system and method may be used in the efficient transportation and distribution of extremely large numbers of mail items.

A number of specialized terms shall be used in the description of the system and method of the present invention. First, with respect to mail types, the following definitions apply:

(a) "Flat" generally refers to flat-size mail. It may include mail that is within the dimensions of 15 inches long, 12 inches high, and ¾ of an inch thick;

(b) "Letter" generally refers to letter-size mail. It may include mail that is within the dimensions of 11 and ½ inches long, 6 and ⅛ inches high, and ¼ inch thick;

(c) "Parcel" generally refers to mail items that are outside the dimensions of Flats and Letters, yet that still fit within a mail sack or container; and (d) "Priority"—generally refers to mail items for which expedited treatment is required.

It should be noted that, with respect to size, the terms "flat," "letter," and "parcel" are exemplary only. In essence, when dealing with a plurality of differently-sized items to be shipped, a "flat" may represent any established first size for an item to be shipped, a "letter" may represent any established second size for an item to be shipped, and a "parcel" represents any established third size for an item to be shipped. It should be noted further that there can be any desired number of established sizes of items to be shipped, with each established size being defined based on the particular items to be shipped. The actual sizes for each class can be varied as desired.

In a similar vein, the term "priority" represents any established expediting service for the shipment of items to be shipped, utilizing the method hereof with respect to particular items to be shipped. The actual duration of such expediting service can be varied as desired.

It should be noted that other criteria could be utilized to allocate distribution among facilities of items that are to be shipped, including for example package color, health and/or safety considerations, etc.

Figure 4:
FIG. 4 is a map illustrating assignments of multiple geographic areas to a single ODF.

Other specialized terms used herein include the following:

(a) Origin Facility/Destination Facility ("ODF")—the initial recipients of mail collection, and from which mail will be processed for transport to delivery units. Initial and final sorting of mail occurs at an ODF for all turnaround mail (network bound mail receives its initial sort at the ONCP). As shown in FIG. 4, ODFs (represented by an upright triangle) receive mail from delivery units within designated geographic areas (represented by circles). (For purposes of the United States Postal Service, the geographic areas are identified according to three digit ZIP CODE areas, though other means for identifying particular geographic areas can be utilized.) Preferably, each geographic area (e.g., each three digit zip code area) is assigned to only one ODF. ODFs will typically receive mail from more than one three digit zip code area, but in some cases it may receive may from only one three digit zip code area. Zip codes are assigned to NCPs based upon least cost network design while meeting constraints such as the geographical distance between zips and ODFs, mail volumes (workload), and available facility capacity.

Figure 5:
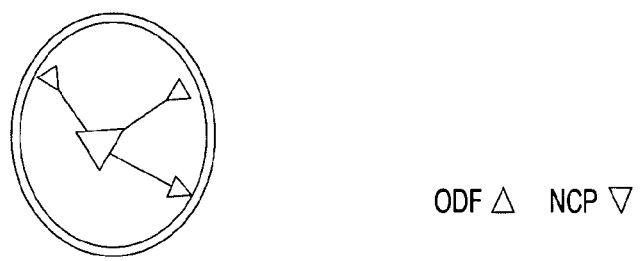
FIG. 5 is a map illustrating assignments of multiple ODFs to a single NCP.
Figure 6:
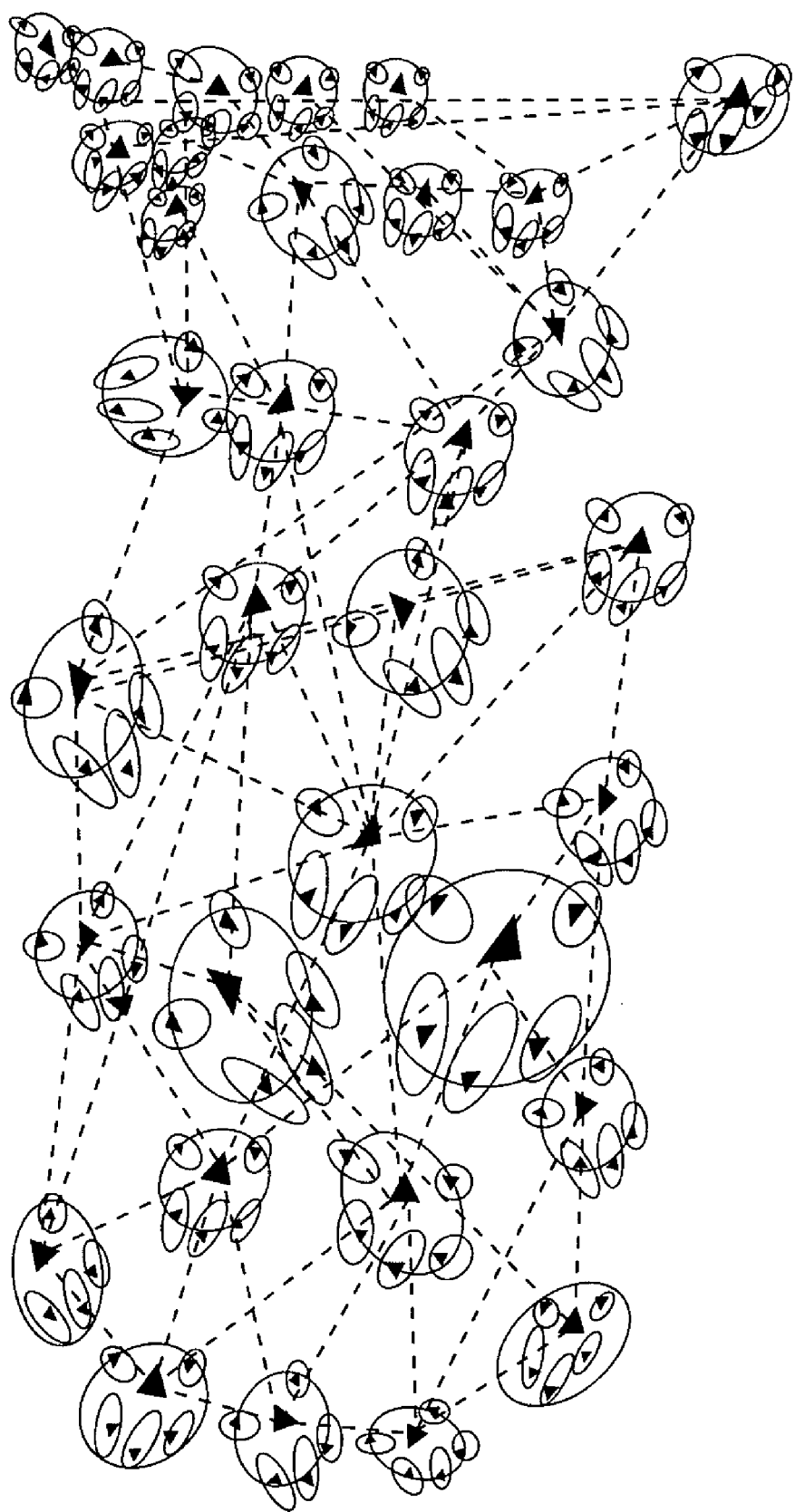
FIG. 6 is a map of an NCP network, comprising a plurality of NCP's, each linked to its ODFs, with routes between NCPs.

(b) Network Control Point or "NCP"—The NCP is the facility that performs the initial network sort for originating mail items after they have been initially received by the ODF where they were mailed, and before they are finally sorted at the ODF where it will be delivered. ODFs are assigned to NCPs based upon least cost network design while meeting constraints such as the geographical distance between ODFs and NCPs, mail volumes (workload) and available facility capacity. (The ODFs assigned to a particular NCP can be located in different states, counties, etc.) FIG. 5 illustrates the assignment of a plurality of ODFs to a single NCP (represented by a larger, inverted triangle). As shown in FIG. 5, preferably, each ODF is assigned to a single NCP that is not co-located within the same facility. On the other hand, generally and as shown in FIG. 6, Each NCP (represented by a large triangle) will receive mail from several ODFs (represented by smaller triangles), with each NCP maintaining transport connectivity throughout the network with other NCP's—though not with ODFs other than those that have been assigned to them. In some cases, it may be necessary to co-locate an NCP and one of its assigned ODFs within the same facility or campus of facilities.

(c) Originating Network Control Point, or "ONCP" and Destinating Network Control Point, or "DNCP"—These come into play where an NCP receives mail from an ODF that is destined for a different ODF that may or may not be part of the NCP's service area. In such instance, the first NCP provides the network piece-sortation for all destinating ODFs consistent with its role as an Originating NCP, or ONCP. Where mail is destined for an ODF that is not part of the ONCP's service area, the mail is containerized and transported from the ONCP to the NCP assigned to the particular ODF where the mail is destined. In such instance, the second NCP is the Destinating NCP, or DNCP.

(d) Intermediate Network Control Point, or "INCP"—If there is no direct transport link between the ONCP and the DNCP, the mail will be sent to an intermediate NCP, or INCP. The INCP acts as a transportation hub between the ONCP and the DNCP. Every NCP will function as an ONCP and a DNCP depending upon whether the mail is originating or destinating at one of its ODFs. Additionally, every NCP has the ability to provide INCP functionality for the purpose of transportation cost short-cutting. Such INCP functionality may include build/bulk, cross-dock, and/or break-bulk operations.

Furthermore, it is intended that a particular INCP network (subset of all NCPs) will be defined for the purpose of providing a higher-level of dropship entry points. It is expected that this INCP subset will lessen the need for sacks as a mail prep resource within the network and will encourage further workshare opportunities.

(e) Origin air mail center, or "OAMC", and destination air mail center, or DAMC—Where there is no efficient ground transportation route between an ONCP and a DNCP, either directly or through an INCP, mail is shipped by air. In this instance, mail travels from an ONCP to an origin air mail center, or OAMC. At the OAMC, the mail is placed on air transportation to the destination AMC, or DAMC. From the DAMC, the mail is sent to the DNCP. Each NCP is assigned to one and only one AMC. Every AMC is both an OAMC and a DAMC, depending on whether the mail is originating or destinating at one of its NCP's.

(f) "Turnaround"—refers to mail items whose origin and destination are both within a particular ODF's geographic area (e.g., three digit ZIP CODE area).

(g) "Plant Load" and "Drop Shipment"—In some instances, preliminary sorting is conducted by a private actor, and preliminarily sorted mail items may be delivered in large volume by the private actor into the system. Typically, a large volume shipment that is delivered to an originating ODF or an ONCP is regarded as a plant load. A large volume shipment that is delivered to a destination ODF, an INCP, or a DNCP is regarded as a drop shipment.

It should be noted that the terms ODF, NCP and the like, as used herein, are exemplary only, and that other terms may be utilized to describe facilities that perform the functions described herein.

The ODF and the NCP are primarily distinguished by their location within the network and the different types of distribution that occurs therein (i.e., initial and final sorting at the ODF, and intermediate/initial network sorting at the NCP). The ODFs and the NCPs to which they are assigned have present therein automated processing equipment of a type suitable for the processing of items having an established physical shape. For example, all ODFs specialize in the distribution of both "letters" and "flats," whereas an NCP specializes in the distribution of "bundles" and "parcels" while providing a supporting role in the network distribution of "letters" and "flats." In other words, the assignment of ODFs to NCPs takes into consideration product "shape," the geographical area in which the ODFs and NCPs are located, and the proximity of ODFs to their respectively assigned NCPs. Typically, the predominant "shape" criteria for ODF role assignments will be Letters and Flats, which represent the largest percentage of mail items within a typical mail system. The predominant shape criteria for NCP role assignments will be Bundles and Parcels. Seen in this light, the system described herein is "shape-based."

Figure 1:
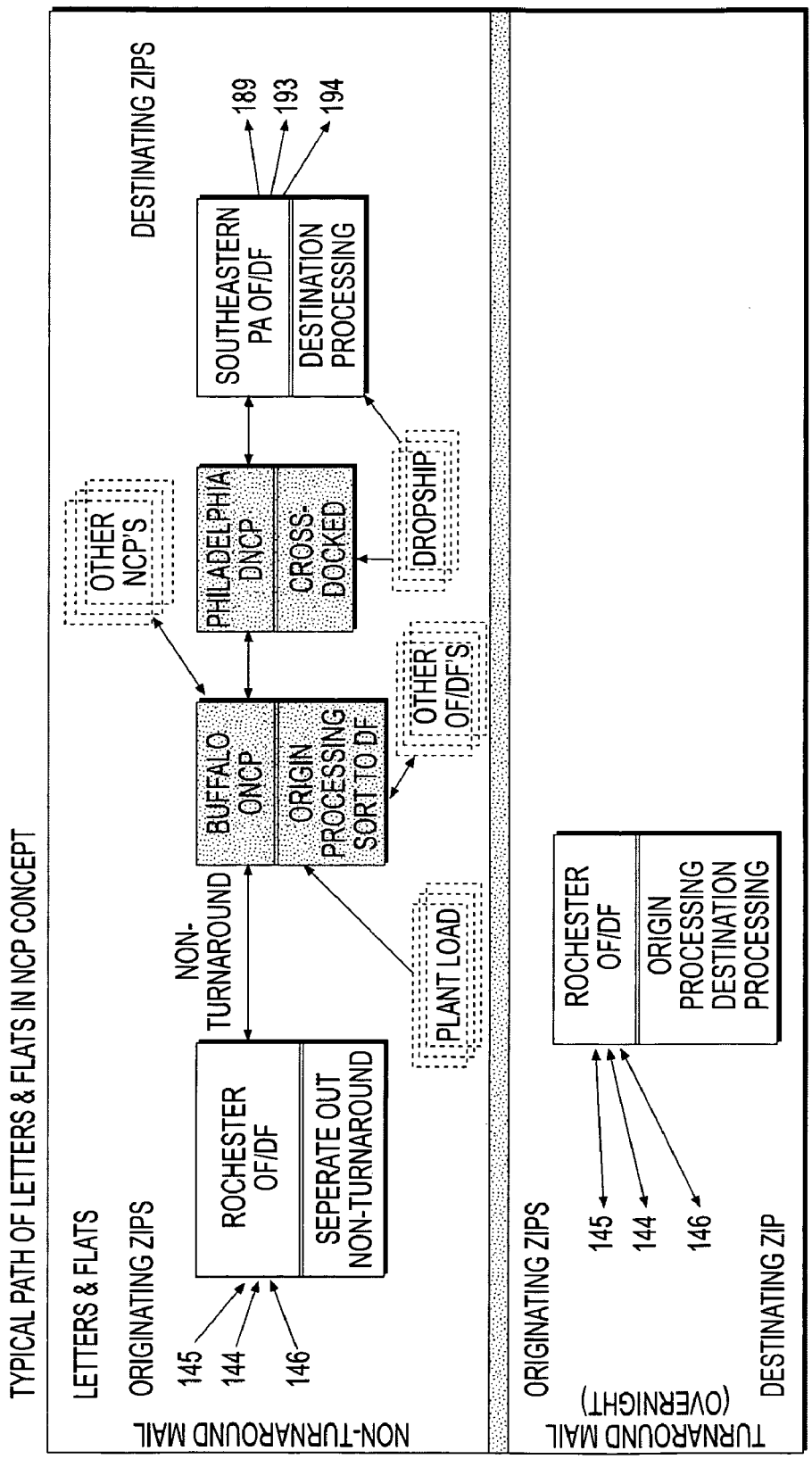
FIG. 1 is a flow-style chart illustrating the flow of letters and flats according to an embodiment of a method and system consistent with the present invention, treating separately non-turnaround mail and turnaround mail.

Referring now to FIG. 1, one possible path of mail items (in this example Letters and Flats) through ODF and NCP facilities, consistent with the system and method of the present invention, is shown. Initially, items enter a particular ODF (identified as the "OF" in the drawing figure), according to the originating geographic area (e.g., three digit ZIP code area) for the item. The items are then separated as between turn-around (also referred to as "local") and non-turnaround, with turnaround mail being origin and destination processed within the OF.

For Letters and Flats that are turnaround, the OF will perform origin processing. This will include, preferably, cancellation, outgoing primary, incoming primary, incoming secondary and DPS. It will also perform all image lift resolution. Non-turnaround Letters and Flats are then transported from the OF to an ONCP for the purpose of receiving network distribution to the DF sort level and subsequent container and transport consolidation. The ONCP may also directly receive Plant Loads.

Some mail items may go directly from an ONCP to a destination ODF or "DF," depending on the destinating geographic area (e.g., three digit ZIP code) for particular items, while others will continue to a DNCP, before continuing on to a DF. (As discussed above, in some instances, it may be necessary for mail items to be transported from an ONCP to an INCP and then on to a DNCP. Air shipment between the ONCP and DNCP, through an OAMC and a DAMC, may also be necessary.) As shown in FIG. 1, the DNCP may also receive Drop Shipments.

From the DNCP, Letters and Flats are transported to a DF for destination processing, where the DF is selected based on the destination geographic area (e.g., three digit ZIP code) for the particular mail items. The DF, like the DNCP, may also receive Drop Shipments. As such, non-turnaround Letters and Flats receive piece-sortation at only ONCPs and DFs.

Figure 2:
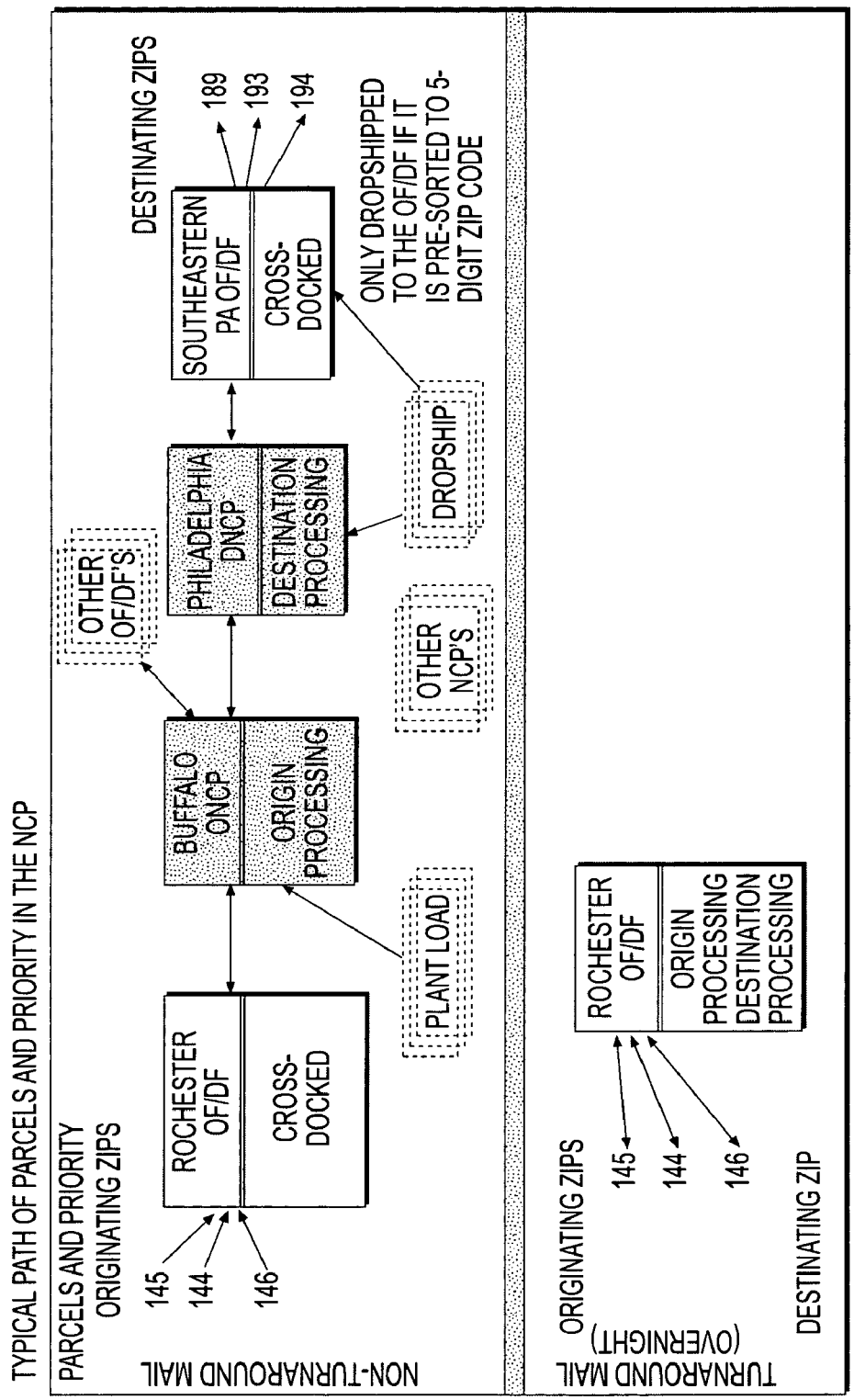
FIG. 2 is a flow-style chart illustrating the flow of parcels and Priority mail according to an embodiment of a method and system consistent with the present invention, treating separately non-turnaround mail and turnaround mail.

Referring now to FIG. 2, it can be seen that the processing of turnaround Parcels and Priority is the same as for turnaround Letters and Flats—i.e., all origin and destination processing occurs in the OF/DF. Non-turnaround Parcel and Priority items will follow a similar transportation path as Letters and Flats, except that piece processing will occur strictly within NCP facilities having automated processing equipment for these physical shapes as discussed above. In other words and by way of example, within a particular geographic area, it will be preferred to have an ODF for Letters and Flats, and a corresponding NCP for Parcels and Priority mail that contains automated processing equipment for the corresponding physical shape. Since NCPs may be assigned multiple ODFs, the geographic service area covered by an NCP is equal to the sum of the service areas covered by its respectively assigned ODFs.

Figure 3:
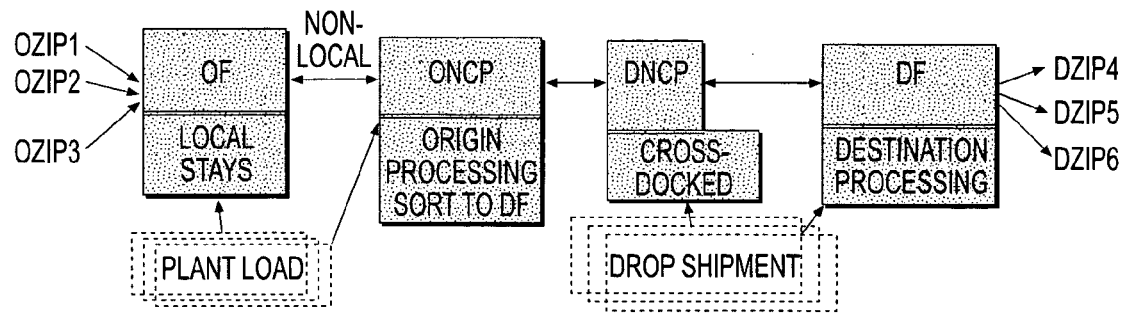
FIG. 3 is a flow-style chart illustrating the flow of parcels and Priority mail according to an embodiment of a method and system consistent with the present invention.

Referring now to FIG. 3, another illustration of mail flow through an embodiment of the system and method described herein is presented. Mail items within particular geographic areas (identified here as OZIP1, OZIP2 and OZIP3) and having a particular shape are assigned to a single OF. Turnaround, or "local" mail, is origin and destination processed at the OF, while non-local mail continues to the assigned ONCP. The OF and the ONCP can each receive Plant Loads.

The ONCP conducts intermediate processing, and then transports the mail items to a DNCP for subsequent transportation to a DF. Transportation may also occur directly from the ONCP to the DF, or by way of an INCP. The DNCP and DF can each receive Drop Shipments.

While, in a preferred embodiment, the system and method of the present invention may be utilized for the transportation and distribution of mail items, it should be understood that it could be used for the transportation and distribution of non-mail items as well. In the event of such application, certain substitutions to the elements of the method and system of the present invention will be made, as necessary, to permit use with non-mail items.

I claim:

1. A method for transporting and distributing items via an origin facility, an origin network control point, a destination network control point, and a destination facility comprising:
   establishing at least a first shape category and a second shape category for said items;
   receiving, at said origin facility, a plurality of items within said first shape category and a plurality of items within said second shape category;
   origin processing said plurality of items within said first shape category, using automatic processing equipment capable of image lift resolution, at said origin facility;
   transporting, according to shape category, said origin-processed plurality of items within said first shape category and said plurality of items within said second shape category, without origin processing, to said origin network control point;
   origin processing said plurality of items within said second shape category, using automatic processing equipment capable of image lift resolution, at said origin network control point;
   transporting, according to shape category, said origin-processed plurality of items within said first shape category and said origin-processed plurality of items within said second shape category to said destination network control point;
   destination processing said plurality of items within said second shape category at said destination network control point;
   transporting, according to shape category, said origin-processed plurality of items within said first shape category and said destination-processed plurality of items within said second shape category to said destination facility; and
   destination processing said plurality of items within said first shape category at said destination facility.

2. The method of claim 1 further comprising:
   separating, at said origin facility, said plurality of items within said first shape category into a first group and a second group,
   the first group comprising turnaround items destination-addressed within a geographic area assigned to said origin facility, and the second group comprising non-turnaround items destination-addressed outside said geographic area assigned to said origin facility;
   separating, at said origin facility, said plurality of items within said second shape category into the first group and the second group,
   destination processing said first group at said origin facility;
   transporting said first group from said origin facility to at least one delivery unit in said geographic area; and
   transporting said second group from said origin facility to said destination network control point.

3. The method of claim 1, wherein transporting said origin-processed plurality of items within said first shape category and said origin-processed plurality of items within said second shape category to said destination network control point further comprises:
   transporting, according to shape category, said origin-processed plurality of items within said first shape category and said origin-processed plurality of items within said second shape category to an origin air center; and
   transporting, according to shape category, said origin-processed plurality of items within said first shape category and said origin-processed plurality of items within said second shape category from said origin air center to a destination air center.

4. The method of claim 1, wherein transporting to said destination network control point further comprises:
   transporting, according to shape category, said origin-processed plurality of items within said first shape category and said origin-processed plurality of items within said second shape category from said origin network control point to at least one intermediate network control point; and transporting, according to shape category, said origin-processed plurality of items within said first shape category and said origin-processed plurality of items within said second shape category from said at least one intermediate network control point to said destination network control point.

5. The method of claim 1 further comprising:

receiving at said origin facility a plant load containing a plurality of items in said first shape category; and transporting, based on said first shape category, said plant load from said origin facility to said origin network control point.

6. The method of claim 1 further comprising receiving at said origin network control point a plant load containing a plurality of items within said first shape category.

7. The method of claim 1 further comprising:

receiving at said destination network control point a drop shipment, from a private actor, containing a plurality of items within said first shape category.

8. The method of claim 1 further comprising:

receiving at said destination facility a drop shipment, from a private actor, containing a plurality of items within said first shape category.

9. The method of claim 1 further comprising:

establishing a third shape category;

receiving at said origin facility a plurality of items within said third shape category;

origin processing said plurality of items within said third shape category at said origin facility;

transporting, according to shape category, said origin-processed plurality of items within said third shape category to said destination facility point; and destination processing said plurality of items within said third shape category at said destination facility.

* * * * *